Figure 1:
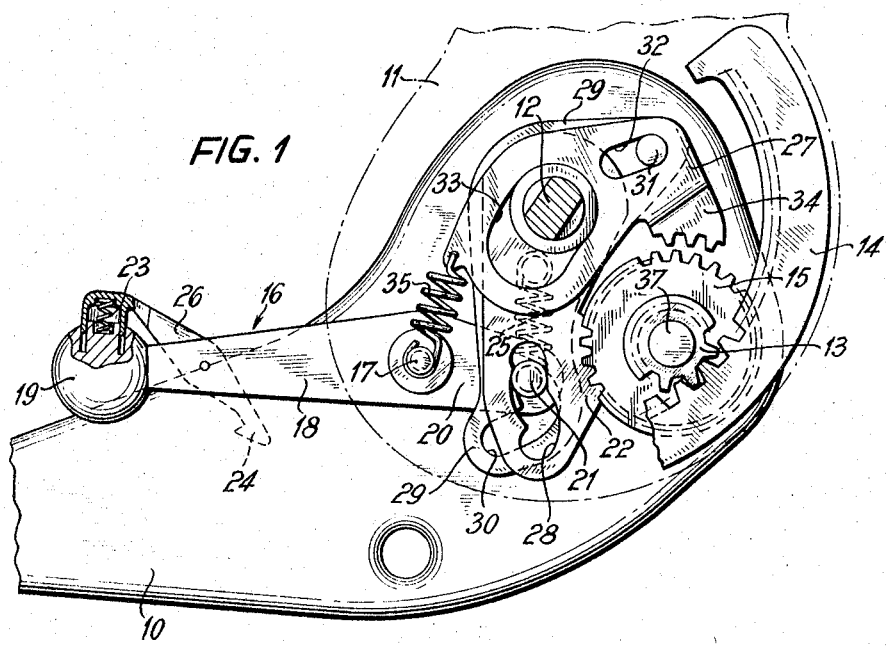

Jan. 24, 1967  H. WERNER  3,299,466
JOINT FITTING FOR ADJUSTABLE BACKREST
Filed Nov. 4, 1963  2 Sheets-Sheet 1

INVENTOR
Heinz Werner
by
Michael J. Striker

Jan. 24, 1967    H. WERNER    3,299,466
JOINT FITTING FOR ADJUSTABLE BACKREST
Filed Nov. 4, 1963    2 Sheets-Sheet 2

INVENTOR
Heinz Werner
by Richard J. Striker
Atty

United States Patent Office 3,299,466
Patented Jan. 24, 1967

3,299,466
JOINT FITTING FOR ADJUSTABLE BACKREST
Heinz Werner, Remscheid-Hasten, Germany, assignor to
Fa. Fritz Keiper, Remscheid-Hasten, Germany
Filed Nov. 4, 1963, Ser. No. 321,111
11 Claims. (Cl. 16—146)

The invention relates to a joint fitting for adjustable backrests, particularly those on seats in vehicles.

Various embodiments of joint fittings for adjustable back rests, particularly for seats in vehicles, are known, and especially embodiments equipped with a so-called free-tilting means. A free-tilting means of this kind does in fact have the advantage of enabling the back rest to be transferred rapidly to the desired position, but on the other hand known embodiments still have considerable disadvantages. For example, a joint fitting is known in which the back rest can be moved into the lying position by operating the handle and thus transferring the lock to its inactive position. This method may lead to accidents, for if, for example, the driver unintentionally operates the handle while driving, the back rest loses its hold and may fall backwards taking the driver with it.

An improved embodiment of a joint fitting partially avoids this danger. In it the back rest can be moved backwards from the boarding position only as far as the normal position, and when this is reached, the lock drops into place. Another defect of known embodiments is that the joint fittings are often not protected from forces acting on the back rest from the rear. If, for example, the persons sitting at the back lean on the back rest in front of them when the vehicle is braked, this force is operative in addition to the mass moment of inertia.

The invention aims to provide a further improvement in joint fittings for adjustable back rests of the type defined above and particularly to avoid the above-mentioned disadvantages of known embodiments. According to the invention, the joint fitting has an additional lock which allows the back rest to be moved backwardly in stages from a boarding position to a normal or, in certain cases, a lying position. In this embodiment of a joint fitting, operation of the handle releases the actual lock, but before the back rest is finally freed the second lock comes into action and allows the back rest to be moved only in stages, by only one step each time. In other words, the back rest can be moved backwardly only a short distance, thus eliminating the danger of accident caused by the slipping of the back rest. On the other hand, the joint fitting according to the invention makes provision for the back rest to be tilted freely, although for this purpose another lock, which will be described later, has to be operated. Only then can the back rest be moved freely in both directions.

It is advisable that the additional lock, which has toothing at one end, be mounted for displacement on the rotary shaft for the limbs of the joint, and that the other end of the lock be spring-loaded. In this case it is desirable that the other end of the spring engages a pivot acting as a point of rotation for the operating lever.

Further according to the invention, the lock co-operates with a rotary elbow lever, of which one limb carries a cam engaging in a slot in the lock and the other limb contains a slot into which another cam on the operating lever engages. The cam on the operating lever also engages in a slot in the catch lever, and both slots are designed so that when the back rest is in the normal position the actual catch lever engages in the ratchet wheel, when he back rest is positioned for adjustment in stages the second lock engages in the ratchet wheel, and when the back rest is in the free-tilting position, both locks are out of engagement with the ratchet wheel. This arrangement makes it possible for both locks to be operated with one lever.

It is desirable that the second, additional lock contains a further slot through which the rotary shaft for the two limbs of the joint passes. With this construction the two above-mentioned cams can be relieved of the forces which would otherwise impinge on them, and a considerable portion of these forces are absorbed by the strong shaft for the two limbs of the joint.

The length of each step can be chosen according to requirements, although the back rest will generally be moved in steps corresponding to one tooth of the ratchet wheel. If required, however, it would be perfectly possible to move the back rest backwards in stages corresponding to two teeth.

In order that the back rest can be tilted freely, the operating lever carries a rotary pawl, the lug of which co-operates with parts of one of the limbs of the joint when in its locking position. If the pawl is not operated, it is impossible to tilt the back rest freely; the pawl must first be transferred to its released position. This is done by exerting pressure on the one end of the pawl which is loaded by a spring engaging the lever knob. This tilts the other end so that it can move out through an aperture in one limb of the joint. As a result, the lug carried by this other end cannot return to its locking position.

Figure 2:
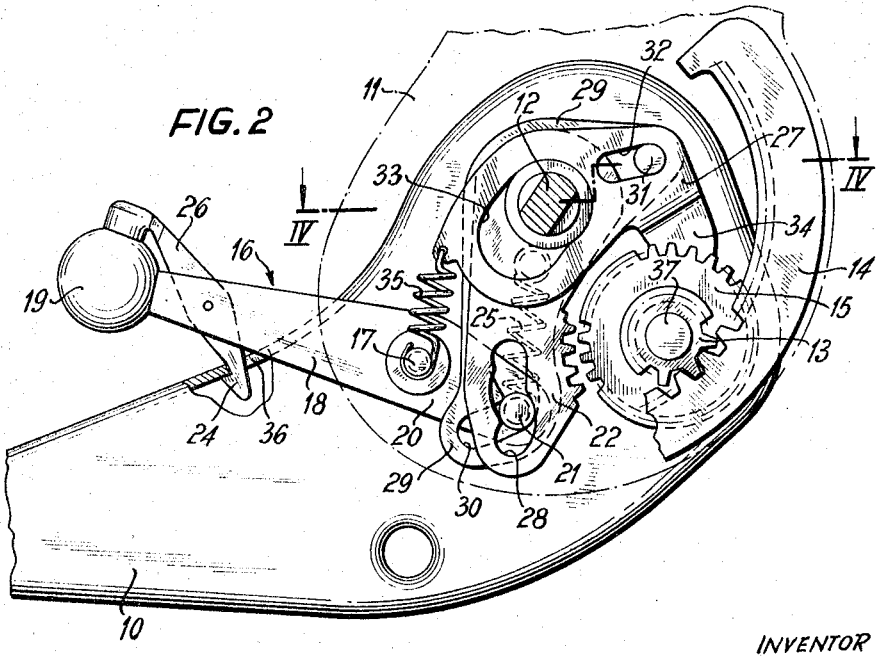
Figure 3:
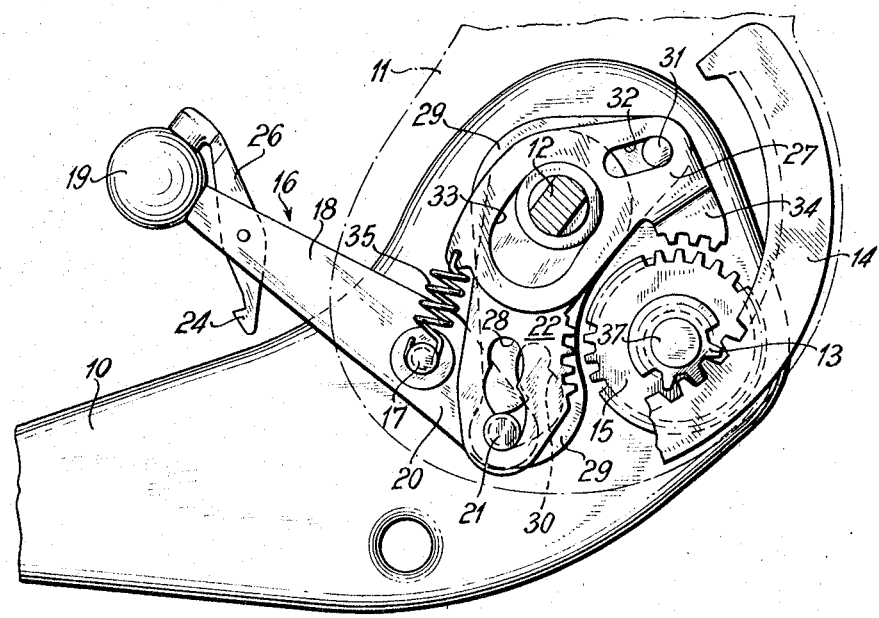
Figure 4:
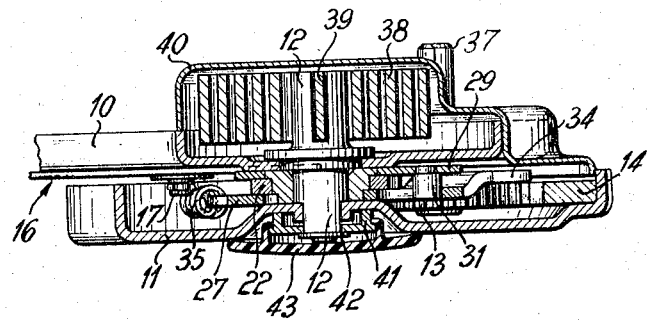

Further details of the invention are given in the specific description which now follows:

An example of the invention is shown in the drawing, in which:

FIG. 1 shows part of a seat fitting according to the invention with the joint member for the back rest raised in the locking position, FIG. 2 shows the fitting in FIG. 1, but with the components positioned for adjustment in stages, FIG. 3 shows the fitting in FIG. 1, but positioned for free tilting, and FIG. 4 is a section through a fitting taken along the line IV—IV in FIG. 2.

The drawings illustrate only those parts of an adjustable seat which are important to an understanding of the invention. For example, the seat itself and the back rest have been omitted.

FIG. 1 shows the joint member 10, which is fixed to the seat, and—indicated in outline—the raised position adopted by the joint member 11 for attachment to the back rest. These joint members are attached in known manner, for example by being screwed to rigid portions of the framework of the seat and back rest.

The common point of rotation for the joint members 10, 11 is formed by a pivot 12. This is also used for mounting various components sandwiched between the joint members 10, 11. All the components supported by the pivot 12 are mounted for rotation, except the joint member 11 for the back rest. The pivot 12 is mounted non-rotatably in this member.

The angular position of the two joint members 10, 11 is determined by a pinion 13 which is rotatably associated with the member 10. The pinion 13 is fixed to a shaft 37 rotatably mounted on the member 10 and the pinion co-operates with a toothed segment 14 fixed to the joint member 11. Thus, the angular position of the joint members 10, 11 is determined by the angular position of the pinion 13, and an identical angular positon of the pinion 13 may recur, for example after a complete revolution, and the pinion can then engage a different portion of the toothed segment 14. Thus the securing of the pinion 13 is of decisive importance for securing the two joint members 10, 11. In order to enable the pinion 13 to be thus secured, it is fixed coaxially to a ratchet wheel 15 with peripheral toothing.

The portions of the seat fitting used for support, unlocking and adjustment purposes are brought into the requisite position by moving the operating lever 16. The lever 16 is in the form of a two-armed lever and is mounted for rotation on the member 10 by means of a pivot 17. The longer arm 18 of the lever is provided with a spherical knob 19, which acts as a handle. The short lever arm 20 has a cam 21 at its free end. A pawl 26 is articulated to the long arm and, in one embodiment of the knob 19, is biassed at one end by a compression spring 23 and at the other end has a lug 24 which co-operates with parts of the member 10 when the lever 16 is in a position to be described later.

The operating lever 16 is biassed counterclockwise by a tension spring 25 mounted at the side of the joint member 10 facing the seat. If the lever 16 is moved against this bias, a catch lever 22 is disengaged from the toothing on the ratchet wheel 15 in a first step, an da lock 27 for limiting the adjustment in stages is simultaneously engaged in the wheel 15 (see FIG. 2). In a further step, the lock 27 is disengaged in addition to the catch lever 22 (FIG. 3).

The catch lever 22 acts directly. It is in the form of a one-armed lever rotatably mounted on the pivot 12, and its free end has an aperture 28 with a plurality of curved portions. The cam 21 of the operating lever 16 co-operates with the marginal portions of these curves.

The lock 27, on the other hand, is moved only indirectly by the lever 16 This takes place through an elbow lever 29 which—like the catch lever 22—is rotatably mounted on the pivot 12 and lies flat between the lever 22 and the joint member 10. As in the case of the catch lever 22, the movement is initiated by the cam 21, which also engages in a multi-arcuate aperture 30 associated with the long limb of the elbow lever 29 and which interacts with the marginal portions thereof. The end of the short limb of the lever 29 carries a cam 31 extending into an aperture 32 in the lock 27.

The lock 27 lies flat on the catch lever 22 and is mounted for displacement. It is displaced substantially along an arc with its centre coinciding with that of the shaft 37 for the pinion 13 and ratchet wheel 15. In order to obtain freedom of displacement, the lock contains a slot 33 enclosing the pivot 12 and corresponding in size to the amount of displacement. For the same reasons the aperture 32 in the lock 27 is also in the form of a slot. The lock 27 is in two different planes. The portion 34 of the lock 27 is bent towards the joint member 10 by means of a shoulder, in such a way that it lies in the plane of the ratchet wheel 15. The lock 27 is loaded by a tension spring 35, fixed at the other end to the pivot pin 17 so that one edge of the slot 33 is kept in contact with the pivot 12.

FIG. 1 shows the locked position of the seat fitting, in which the back rest is secured against tilting. It is fixed through the toothing on the catch lever 22 engaging in the toothing on the ratchet wheel 15, whereby the pinion 13 connected to the wheel 15 is prevented from rotating so that movement along the toothed segment 14 connected to the joint-lever 11 of the back rest becomes impossible. When the catch lever 22 is locked the operating lever 16 adopts its rest position, in which it is held by the biased tension spring 25. Thus, the cam 21 co-operates with the upper portion of the multi-arcuate edge of the aperture 28 in the catch lever 22 and holds it in engagement with the ratchet wheel 15.

FIG. 2 shows the components of the seat fitting in the position in which the back rest can be moved backwardly in stages. For this purpose the operating lever 16 is pulled up against the bias of the tension spring 25, sufficiently to enable the lug 24 on the pawl 26 to abut marginal portion of an aperture 36 in the joint member 10. The position of the catch lever 22 and lock 27 are determined by the position of the cam 21 of the lever 16 in the multi-arcuate surfaces of the aperture 28 in the catch lever 22 and of the aperture 30 in the elbow lever 29. These are designed to enable the toothed edge of the catch lever 22 to be removed easily from the toothing on the ratchet wheel 15, so that unlocking can take place at this point. Before this unlocking process is completed, however, and overlapping in space, another locking means becomes effective, in that the toothed surface of the lock 27 is now brought into engagement with the toothing on the ratchet wheel 15. Locking takes place through the cam 21 interacting with the walls of the aperture 30, designed as cam faces, in such a way that the elbow lever 29 is rotated clockwise about its point of rotation, the pivot 12. In this way the cam 31, which is associated with the elbow lever 29 and mounted in the aperture 32 in the lock 27, entrains the latter in its rotary direction until the toothing thereof engages in the toothing on the ratchet wheel 15. The resultant locking action prevents the backrest from being moved forwardly, although it can be tilted backwardly one step. This involves raising the operating lever 16, which must be held in the raised position until the backward step is completed.

The backward tilting of the back rest causes the toothed segment 14 associated with the joint member 11 to swing about the pivot 12, so that the pinion 13 engaging the segment 14 and the ratchet wheel 15 fixed to the pinion 13 are loaded for clockwise rotation. The load is transmitted to the lock 27, and this follows the load until its movement is limited by the walls of the two slot-shaped apertures 32 and 33, which act as abutments. When the lever 16 is released, it is returned to its rest position by the spring 25. The components then re-adopt their original position shown in FIG. 1. It is desirable for the length of the step to be such that the ratchet wheel 15 is rotated the length of one tooth, so that the toothing on the catch lever 22 returns to the gap between the teeth on the wheel 15. The fact that the movement is transmitted from the large-diameter ratchet wheel 15 to the substantially smaller pinion 13 and that the latter moves along the toothed segment 14 which is at a larger radial spacing from the point of rotation means that the reduction is obtained in extremely small stages and is almost equivalent to continuous adjustment of the back rest.

FIG 3 shows the components of the seat fitting in the position in which they can be freely tilted. In order to reach this position, the operating lever 16 must be moved beyond the position in which the lug 24 of the pawl 26 bears on the marginal portion of the joint member 10. This is possible if the pawl 26 is released, which is done by moving it towards the spherical knob 19. Due to the rocker-like mounting of the pawl 26, the lug 24 is transferred to a position enabling it to pass through the aperture 36 to the outside. When the lever 16 is in this position the catch lever 22 remains in the same unlocked position as in FIG. 2. This is possible because the lower portion of the aperture 28 does not alter its radius about the point of rotation. What is altered is the angular position of the elbow lever 29, which is swung counterclockwise. This is made possible by the special conformation of the bottom of the aperture 30, which has an oblique cam face against which the cam 21 moves. A similar change of angle—relatively to the pivot 12 representing the point of rotation—is undergone by the cam 31 associated with the other limb of the elbow lever 29. This cam 31, which extends into the aperture 32, displaces the lock 27 to the same extent, so that the latter is moved away from the ratchet wheel 15 and the toothing is thus disengaged at this point also.

In such a position the ratchet wheel 15 and thus the pinion 13 engaging the toothed segment 14 can rotate freely, so that the back rest can be moved freely in both directions. When the operating lever 16 is returned to the rest position shown in FIG. 1, the catch lever 22 reengages the ratchet wheel 15, so that the back rest is again secured.

FIG. 4 is a cross-section through the seat fitting also showing additional members. Apart from the components already shown in the preceding figures, these comprise a return spring 38 with its associated casing and the fastening means and decorative cover of the joint member 11 for the back rest. The return spring 38 may be a spiral or a helical spring with one end supported in a transversely extending longitudinal slot 39 in the pivot 12 and the other end attached to a hook on the joint member 10.

The pivot 12 at one end holds the end of the biassed return spring 38 and is non-rotatably mounted at the other end in the joint member 11, which is fixed to the back rest and on which the bias is to act. For this purpose, the pivot 12 is provided with flat portions (shown in FIGS. 1 to 3), which extend into a matching aperture in the joint member 11. A cupped washer 41 co-operating with a disc 42 prevents the joint member 11 from being pulled out. The cupped washer 41 has a peripheral bulge behind which the cupped edge of a decorative cap 43 engages so as to give the cap a firm hold.

As already mentioned, the construction illustrated is only an example of the invention. The invention is not restricted thereto, and many other embodiments and arrangements are possible. Thus, the example is based on the idea of the back rest being displaced in stages corresponding to only one tooth on the ratchet wheel. However, the joint fitting may—by enlarging the longitudinal dimensions of the slots 32 and 33—be designed so that the distance covered during the stepwise adjustment corresponds, for example, to two or more teeth.

I claim:

1. A hinge for use between a back rest and a seat comprising, in combination, a first hinge member adapted to be fixedly mounted on said seat; a second hinge member adapted to be fixedly mounted on said back rest; pivot means pivotally connecting said first and said second hinge member; an operating lever movably between a first, a second and third position; first lock means operable by said operating lever and arranged in said first position of said lever to prevent pivotal movement between said hinge members and in said second and third positions of said lever to allow free pivotal movement of said hinge member; and second lock means operable by said lever such that in said first and third positions of said lever, said second lock means allows free pivotal movement of said hinge members and in said second position of said lever allows a predetermined pivotal movement of said hinge members whereby said back rest may be moved backwardly in predetermined stages on repeated operation of said lever between said first and second positions thereof and said back rest may freely pivotally move with respect to said seat on movement of said operating lever to said third position.

2. A hinge as set forth in claim 1, and including a pawl rotatably mounted on said operating lever, one arm of said pawl having a lug arranged to cooperate with an aperture in said first hinge member to prevent inadvertent movement of said operating lever from said second to said third position.

3. A hinge as set forth in claim 2, wherein said operating lever has an operating knob at one end thereof, and wherein said pawl has another arm supported on said knob, and a spring cooperating with said other arm and biased such that on movement of said operating lever from said first to said second position said lug automatically engages in the aperture in said first hinge member.

4. A hinge as set forth in claim 1, wherein said first lock means comprises a pinion rotatably mounted on said first hinge member, a toothed segment fixedly connected to said second hinge member and arranged to cooperate with said pinion, a ratchet coaxially fixed with said pinion, and a catch lever arranged to be moved into cooperation with said ratchet on movement of said operating lever into said first position to prevent rotation of said pinion and out of cooperation with said ratchet on movement of said operating lever to said second and third positions to allow rotation of said pinion.

5. A hinge as set forth in claim 4, wherein said second lock means comprises a lock member pivotably mounted on said pivot means and arranged to cooperate with said ratchet on movement of said operating lever to said second position and to move out of cooperation with said ratchet on movement of said operating lever to said first and third positions, said lock member being displaceably mounted on said pivot means to allow a predetermined rotation of said ratchet when said operating lever is in said second position.

6. A hinge as set forth in claim 4, wherein said catch lever is pivotally mounted on said pivot means between said first and second hinge members and is provided with teeth arranged to cooperate with teeth on said ratchet, said catch lever being adapted to be pivoted about said pivot means on movement of said operating lever.

7. A hinge as set forth in claim 6, wherein said operating lever is pivotably mounted on said first hinge member, and including a cam on said operating lever, wherein said catch lever is provided with a slot receiving said cam, said slot being shaped to provide the required movement of said catch lever on movement of said operating lever between said first, second and third positions.

8. A hinge as set forth in claim 7, and including spring means extending from said first hinge member to said operating lever and biasing the latter to said first position.

9. A hinge as set forth in claim 7, wherein said second lock means comprises a lock member pivotably mounted on said pivot means between said first and second hinge members, said lock member being formed with a first and a second slot, and said pivot means extending through said first slot, said lock member being toothed for cooperation with the teeth on said ratchet, a bell-crank lever pivotably mounted on said pivot means, a cam carried by one of the arms of the bell-crank lever and engaging in said second slot in said lock member and the other arm of said bell-crank lever having a slot arranged to receive the cam on said operating lever, said slot in said bell-crank lever being so shaped to provide the required movement of said lock member on movement of said operating lever between the first, second and third positions, and said slots in said lock member being dimensioned to allow a predetermined rotation of said ratchet when said operating lever is in said second position.

10. A hinge as set forth in claim 9, wherein said slots in said bell-crank lever and in said lock member are dimensioned to allow said second hinge member when said operating lever is in said second position to rotate through an arc equivalent to at least one tooth on the ratchet.

11. A hinge as set forth in claim 9, and including a spring extending between said lock member and said operating lever and biased such that said pivot means and said cam on said arm of said bell-crank lever are at the extremities of the respective slots when said operating lever is in said first position.

References Cited by the Examiner
UNITED STATES PATENTS

| | | | |
|---|---|---|---|
| 707,607 | 8/1902 | Lowell. | |
| 812,216 | 2/1906 | Lorimer | 74—530 |
| 929,801 | 8/1909 | Sperry. | |
| 2,849,089 | 8/1958 | Lindmark | 74—530 X |
| 2,892,487 | 6/1959 | Herider et al. | 74—535 X |
| 3,185,264 | 5/1965 | Nordstrom et al. | 74—530 X |

FRED C. MATTERN, JR., *Primary Examiner.*

MILTON KAUFMAN, *Examiner.*

C. F. GREEN, *Assistant Examiner.*